(12) United States Patent
Bodet et al.

(10) Patent No.: US 9,403,636 B2
(45) Date of Patent: Aug. 2, 2016

(54) METERING VALVE

(71) Applicant: LINDAL FRANCE SAS, Briey (FR)

(72) Inventors: Hervé Bodet, Verdun (FR); Eric Gaillard, Dieue sur Meuse (FR)

(73) Assignee: LINDAL FRANCE SAS, Briey (FR)

( * ) Notice: Subject to any disclaimer, the term of this patent is extended or adjusted under 35 U.S.C. 154(b) by 0 days.

(21) Appl. No.: 14/760,784

(22) PCT Filed: Jan. 14, 2014

(86) PCT No.: PCT/EP2014/050548
§ 371 (c)(1),
(2) Date: Jul. 14, 2015

(87) PCT Pub. No.: WO2014/111362
PCT Pub. Date: Jul. 24, 2014

(65) Prior Publication Data
US 2015/0353267 A1 Dec. 10, 2015

(30) Foreign Application Priority Data
Jan. 15, 2013 (FR) ..................................... 13 50343

(51) Int. Cl.
*B65D 83/54* (2006.01)
*F16K 1/30* (2006.01)
(Continued)

(52) U.S. Cl.
CPC ................ *B65D 83/54* (2013.01); *B65D 83/48* (2013.01); *F16K 1/30* (2013.01); *F16K 31/58* (2013.01)

(58) Field of Classification Search
CPC ........ B65D 83/54; B65D 83/48; B65D 83/38; F16K 1/30; F16K 31/58; F16K 1/308; F16K 27/02

USPC ........... 251/353, 354, 325; 222/402.1, 402.16
See application file for complete search history.

(56) References Cited

U.S. PATENT DOCUMENTS 2,991,044 A * 7/1961 Briechle ................ B65D 83/48
222/402.24
3,040,936 A   6/1962 Hotta
(Continued)

FOREIGN PATENT DOCUMENTS

AT     388 715 B    8/1989
FR    2 076 684 A5  10/1971
(Continued)

OTHER PUBLICATIONS

International Search Report dated Apr. 15, 2014, issued in corresponding application No. PCT/EP2014/050548 (3 pages).

*Primary Examiner* — John Bastianelli
(74) *Attorney, Agent, or Firm* — Westerman, Hattori, Daniels & Adrian, LLP

(57) ABSTRACT

A metering valve for an aerosol receptacle, is provided with a valve body having an internal chamber (17) for contact either with the internal face of the valve or with the external face of the valve, a stem (41) provided with closure means (42) and placed partly inside the internal chamber (17) for moving between a closed position in which the internal chamber contacts the internal face of the valve, but isolated from its external face, and an open position in which the internal chamber contacts its external face but isolated from its internal face, and a reservoir (R) able to be filled with the stem in the closed position and emptied with the stem in the open position. The reservoir is on the side of the internal face of the valve, outside the valve body, contacting its internal chamber, and formed by at least one flexible membrane (2).

20 Claims, 4 Drawing Sheets

(51) Int. Cl.
*F16K 31/58* (2006.01)
*B65D 83/48* (2006.01)

(56) References Cited

U.S. PATENT DOCUMENTS

| | | | |
|---|---|---|---|
| 3,104,785 A | 9/1963 | Beard, Jr. | |
| 3,235,135 A | 2/1966 | Robert et al. | |
| 3,283,963 A * | 11/1966 | Boyer | B65D 83/14 222/402.13 |
| 3,817,267 A * | 6/1974 | Hicks | F16K 31/58 137/204 |
| 4,858,790 A | 8/1989 | Howlett | |
| 5,450,989 A * | 9/1995 | Gilroy | B65D 83/38 222/402.1 |
| 6,112,950 A | 9/2000 | Di Giovanni et al. | |
| 6,318,603 B1 * | 11/2001 | Burt | B65D 83/54 222/402.1 |
| 7,350,676 B2 * | 4/2008 | Di Giovanni | B65D 83/54 222/402.1 |

FOREIGN PATENT DOCUMENTS

| | | |
|---|---|---|
| FR | 2 740 527 A1 | 4/1997 |
| GB | 2 050 303 A | 1/1981 |
| JP | 6-14081 U | 2/1994 |
| WO | 2004/041340 A2 | 5/2004 |

\* cited by examiner

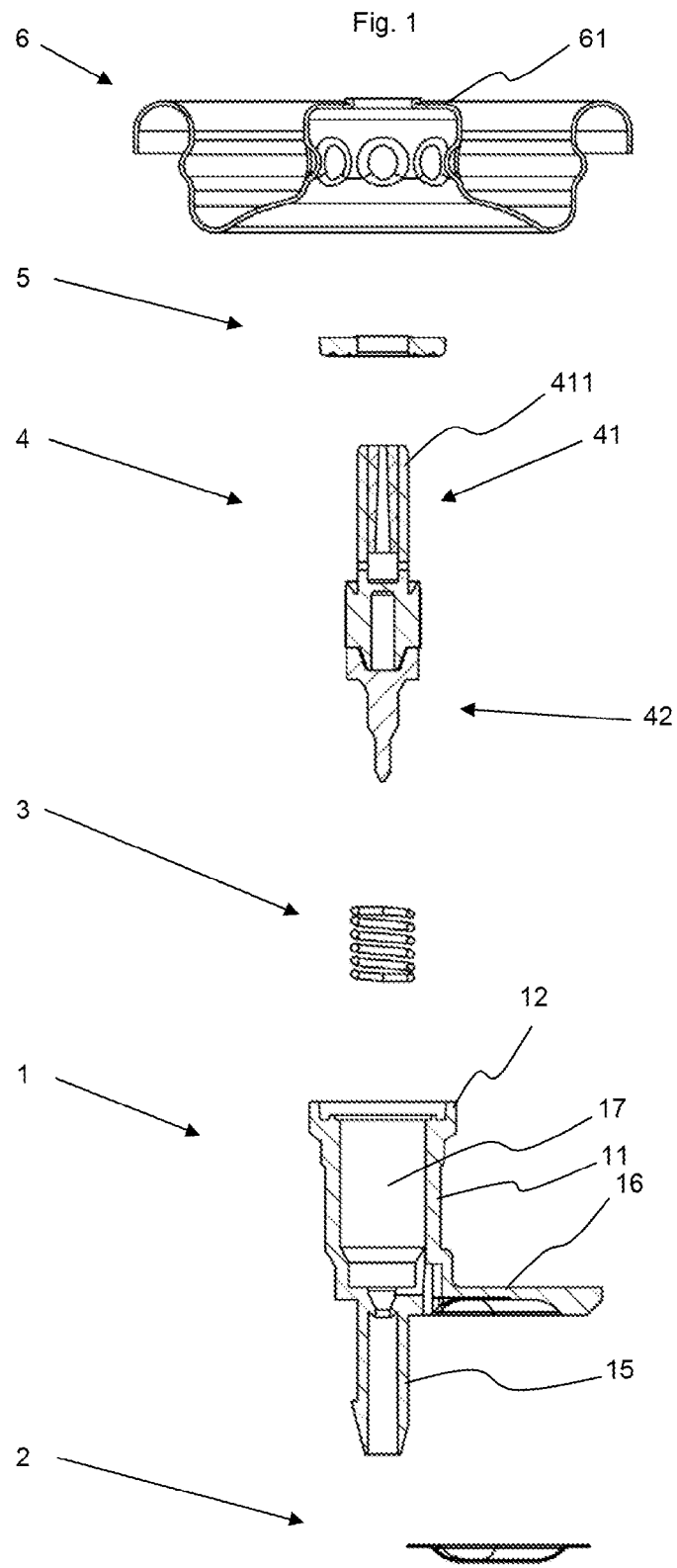

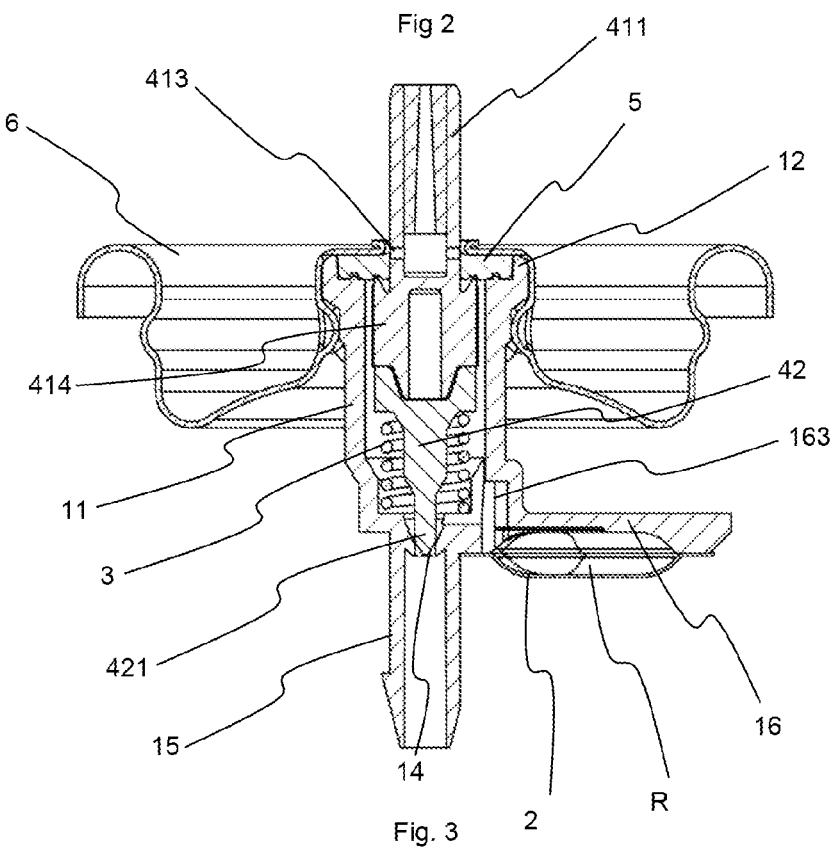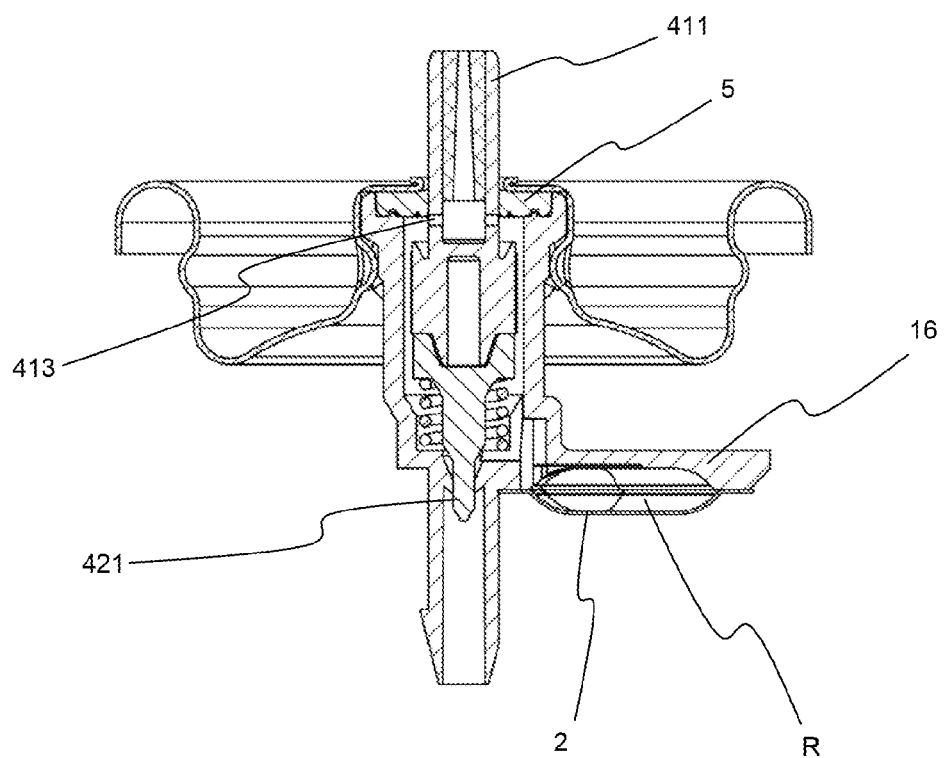

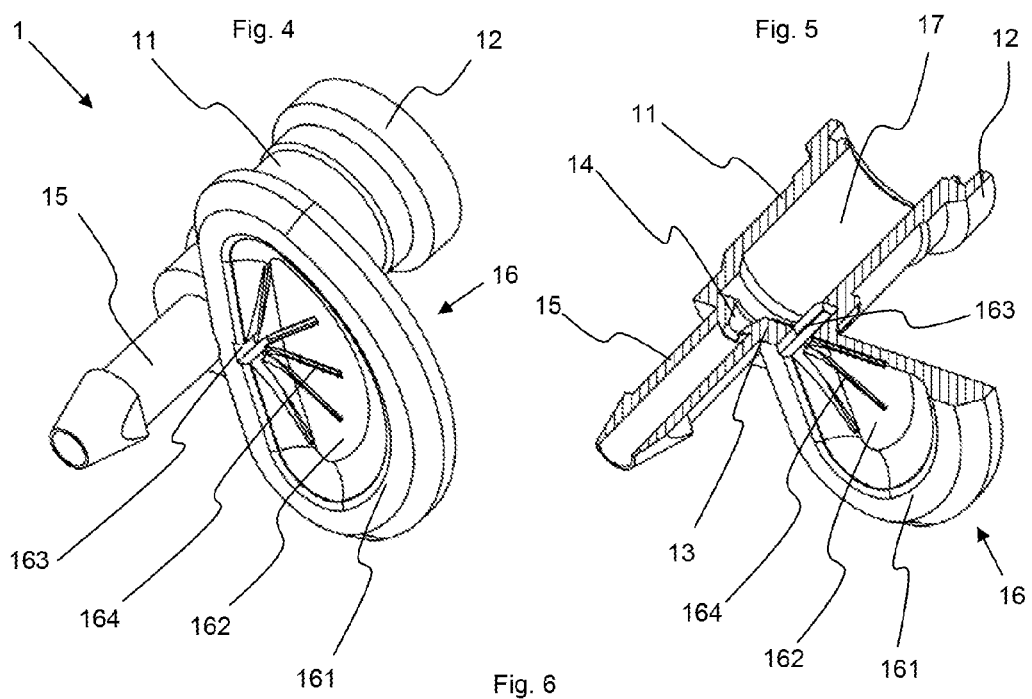

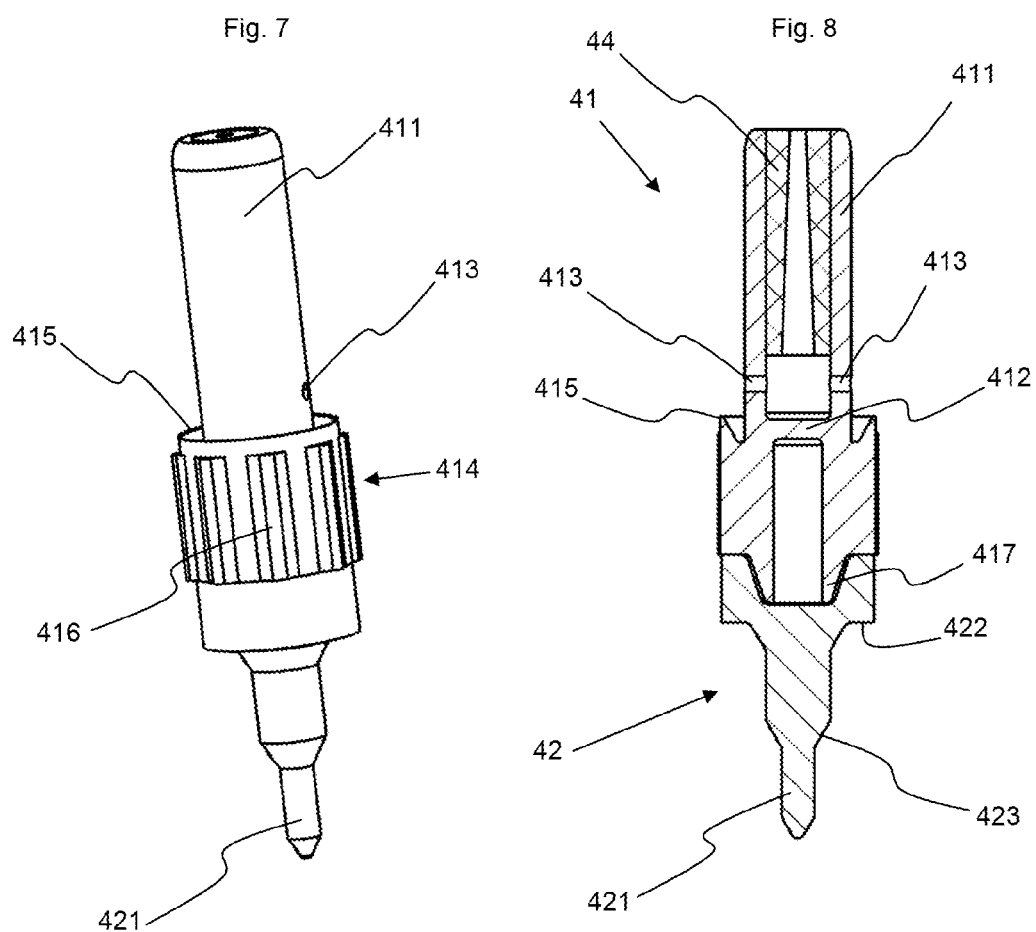

METERING VALVE

The invention relates to a metering valve for an aerosol receptacle, having an internal face intended to be placed inside the aerosol receptacle and an external face intended to be placed outside the aerosol receptacle. The valve is provided with a valve body having an internal chamber that can be put in contact either with the internal face of the valve or with the external face of the valve, a stem provided with closure means and placed partly inside the internal chamber able to move between two positions, namely a closed position in which the internal chamber is in contact with the internal face of the valve but isolated from the external face of the valve, and an open position in which the internal chamber is in contact with the external face of the valve but isolated from the internal face of the valve, and a reservoir (R) that can be filled when the stem is in the closed position and emptied when the stem is in the open position.

There exist several kinds of metering valve for aerosols depending on whether the pressure is exerted by a liquid gas or a pressurised gas. When the gas is liquid, it is mixed with the product. In the closed position of the valve, the product enters a metering chamber of required volume. When the valve is open, the metering chamber is isolated from the pressurising chamber and put in contact with the ambient air. The liquid gas contained in the product expands and causes the expulsion of the product in the form of a spray. If the pressure is exerted by a pressurised gas, it is necessary to empty the reservoir mechanically. This can be achieved for example by means of a spring that pushes the bottom of the reservoir towards the outlet. One example of such a metering valve is known for example from FR 2 740 527. It has the drawback of requiring numerous parts, some of which are therefore movable and risk jamming.

Another solution consists of producing the reservoir from an elastic material. When the stem is in the closed position, the product enters the reservoir, deforming it elastically. When the stem is pressed in, the elastic membrane is no longer subjected to the pressure prevailing in the receptacle. It retracts, returning to its initial shape, and thus expels the product. The choice of materials for such pouches is very restricted. In practice only elastomers can be envisaged. However, they are not compatible with all solutions. In particular, they are incompatible with solutions containing alcohol, perfumes or other additives. The company Mitani markets such a valve under the name MKP. This consists of a valve body with an internal chamber, a stem, an insert placed around the stem and an elastic cylindrical membrane placed between the insert and the valve body. The bottom end of the stem closes off the inlet opening of the internal chamber when it is in the closed position. To provide the seal, the bottom end of the membrane serves as a seal between the bottom end of the stem and the passage opening. When the valve is closed, the product enters the internal chamber under pressure and swells the elastic membrane. When the valve is open, the internal chamber is put to atmospheric pressure and the elastic membrane deflates, expelling the corresponding volume out of the valve. Such valves are known from U.S. Pat. No. 4,858,790.

The objective of the invention is to design a metering valve that is simple and reliable. Another objective is to be able to choose materials that are compatible with a large number of solutions, in particular solutions containing alcohol. The volume of the reservoir must be able to be chosen from a wide range according to requirements.

This objective is achieved in accordance with the invention through the fact that the reservoir is situated on the side of the internal face of the valve, outside the valve body, in that the reservoir is in contact with the internal chamber of the valve body, and through the fact that the reservoir consists of at least one flexible membrane.

The reservoir of the invention is therefore situated sheltered inside of the receptacle, out of reach of the user. It is however subjected to the pressure prevailing inside the receptacle. In addition, the reservoir of the invention is free from any moving part. Only the flexible membrane deforms during filling or expulsion of the dose. The pressure prevailing in the receptacle suffices either to fill the reservoir when the valve is closed or to empty the reservoir when pressing on the flexible membrane.

It is preferable for the reservoir to consist of a rigid wall on which the flexible membrane is fixed. The face of the rigid wall directed towards the flexible membrane and/or the face of the flexible membrane directed towards the rigid wall may have a cavity.

The rigid wall may form an integral part of the valve body or on the contrary constitutes a piece distinct from the valve body.

In order to prevent the formation of isolated pockets, it is preferable to provide grooves in the face of the rigid wall directed towards the flexible membrane and/or in the face of the flexible membrane directed towards the rigid wall.

In order to ensure complete emptying of the reservoir, the flexible membrane may be given the opposite shape to the rigid wall. Thus, under the pressure prevailing in the receptacle, the membrane will come to be crushed exactly against the bottom of the cavity of the rigid wall.

It is not essential for the flexible membrane to be elastic. The choice of materials that can be envisaged is then very great. It is possible in particular to use aluminium laminates such as those used for flexible pouches in bags on valve. The membrane may be produced from a single-material film or a multilayer complex film with or without aluminium.

In order to ensure fluidtightness of the internal chamber vis-à-vis the inside of the receptacle, it is possible to place the closure means for the stem on a connecting piece forming a piece distinct from the stem, the closure means isolating the internal chamber from the internal face of the valve when the stem is in the open position, and putting in contact the internal chamber and internal face of the valve when the stem is in the closed position. This solution makes it possible to use normal stems for the metering valves of the invention. More precisely, the internal chamber and the internal face of the valve may be in contact via a passage opening, and the closure means of the connecting piece may consist of a needle sized so as to enter the passage opening when the stem is in the open position while sealingly closing the passage opening.

Communication between the reservoir and the internal chamber may be provided by a communication channel provided in the valve body for connecting the inside of the reservoir and the internal chamber, said communication channel emerging in the internal chamber, preferably close to the passage opening.

The invention is described in more detail with the help of the following figures, which show an example embodiment.

FIG. 1: an exploded cross-sectional view of the valve;

FIG. 2: a view in cross-section of the valve in the closed position;

FIG. 3: a view in cross-section of the valve in the open position;

FIG. 4: a perspective view of the bottom of the valve body;

FIG. 5: a view in cross-section and perspective of the valve body of FIG. 4;

FIG. 6: a perspective view of the membrane;

FIG. 7: a perspective view of the stem;

FIG. 8: view in cross-section of the stem of FIG. 7.

For reasons of clarity of the description, recourse is had to spatial references such as "lower" and "upper" or "top" and "bottom". These references relate the valve as shown in FIG. 2, with the outlet opening directed upwards. This does not prevent the valve being able to be used in another position. In addition, the majority of parts have, with the exception of a few elements, symmetry of rotation about the vertical axis passing through the centre of the stem and the valve body. The adjectives "axial" or "radial" relate to this vertical symmetry axis.

The valve of the invention is composed essentially of a valve body (1), a membrane (2), a spring (3), a stem/connecting piece assembly (4), an internal seal (5) and a cup (6).

This valve is intended firstly to equip aerosols under the pressure of a compressed gas, in particular compressed air. In such receptacles, the initial pressure lies generally between 8 and 10 bar and at the end of life drops to 2 bar.

The cup (6), the internal seal (5) and the spring (3) are normal parts used for known valves. They will not be described in any further detail.

The valve of the invention is distinguished from known valves through a lateral reservoir (R) integrated in the valve body and by a needle (421) that closes off the inlet opening (14) of the valve body when the valve is open.

The valve body (1) is very similar to common valve bodies. It comprises in particular a substantially cylindrical main part (11) forming an internal chamber (17) inside which the stem/connecting piece assembly (4) fits, in abutment on the spring (3). The upper end of this main part forms a ring (12) slightly wider than the rest of the main part and around which the cup is crimped at its central part (61). The lower end of the main part is closed by a radial wall (13) with a passage opening (14) passing through at its centre. The main part is extended downwards in a known fashion by a pipe (15) to which a plunger tube (not shown) can be fixed, making it possible to reach the bottom of the flask. The passage opening (14) puts in contact the inside of the pipe (15) and the internal chamber (17) of the main part (11). This is preferably frustoconical, so that it is wider on the internal chamber (17) side than on the pipe (15) side.

The valve body of the invention is distinguished from the known valve bodies through the presence of a lateral reservoir (R). This reservoir consists firstly of a concave rigid wall (16) projecting laterally from the valve body and a flexible membrane (2) fixed by its peripheral edge (21) to the peripheral edge (161) of the rigid wall. A communication channel (163) puts the internal chamber (17) of the valve body and the inside of the reservoir (R) in contact. For this purpose, the communication channel emerges on one side in the bottom of the concave rigid wall (16) and on the other side in the internal chamber (17). In the example presented, it emerges in the bottom of the internal chamber (17). This makes it possible to dispose the rigid wall (16) of the reservoir as low as possible. Thus there remains sufficient space between the cup (6) and the rigid wall (16) of the reservoir, in particular for crimping the cup. It would however be possible to make the channel emerge at a higher point.

The membrane (2) preferably has the opposite shape to the cavity (162) in the rigid wall. Thus it can be crushed by the pressure prevailing inside the receptacle against the concave wall while lining the bottom.

It is preferable to provide a few grooves (164) in the bottom of the cavity in the rigid wall. These grooves extend from the inlet of the communication channel (163) in the direction of the peripheral edge of the cavity. The various grooves (164) move away from the communication channel forming a star. Thus, when the membrane is pressed against the concave wall (16), there is no risk of pockets forming without access to the communication channel (163). In addition to or in place of the grooves produced in the bottom of the cavity, it is possible to produce grooves on the face of the membrane directed towards the rigid wall (16).

The stem/connecting piece assembly (4) consists of two distinct elements, namely the stem (41) strictly speaking and a connecting piece (42) terminating in a needle (421). It goes without saying that the two parts could form a single piece. The advantage of having two distinct parts lies in the fact that it is possible to use common stems (41) and to equip them with the connecting piece (42) when they are intended for a valve according to the invention.

The stem (41) consists in its upper part of a tubular part (411) open at its upper end and closed at its lower end by a radial bottom wall (412). One or more outlet orifices (413), preferably oriented radially, provided in the bottom of the tubular part, close to the bottom wall. In the example presented here, there are two of them. These orifices put the inside of the tubular part (411) in contact with the outside. The tubular part (411) is extended downwards by a second essentially cylindrical part (414). The upper end of the second part forms an annular ring (415) projecting upwards, the diameter of which is greater than that of the first tubular part (411). The top of the ring is situated lower than the outlet orifices (413). To facilitate the passage of the product along the stem, the latter is provided on its surface with vertical ribs (416) extending from the lower end of the second part as far as the base of the ring (415). To save on material, it is possible, as is the case in the present example, to hollow out the centre of the second part of the stem. The second part terminates in a nesting tenon (417) on which the connecting piece (42) can nest.

In the example presented here, there is an insert (44) inside the tubular part (411). The function of this insert is to reduce the outlet diameter and to improve the formation of spray. Here also, it is a case of using a common stem and having the possibility of reducing the dead spaces inside the valve.

The connecting piece (42) consists of a cylindrical element terminating in a needle (421). It has in its upper part a recess with a shape that is complementary to or at least compatible with that of the nesting tenon (417). Its diameter decreases progressively and in steps in order to finish in the needle (421). The radial shoulder (422) formed by the first step serves as a support for the spring (3). The shoulder (423) formed by the second step serves as a stop for preventing the connecting piece from penetrating too far forwards in the passage opening (14). This second shoulder is frustoconical, just as the passage opening is. Thus the connecting piece can be pressed into the passage opening to the maximum extent until the second shoulder (423) comes into abutment against the radial wall (13) or the frustoconical opening (14). It goes without saying that it would also be possible for the second shoulder to be radial rather than frustoconical, so that the connecting piece comes into abutment with this second shoulder against the radial wall (13).

The diameter of the needle (421) and that of the passage opening (14) of the valve body are chosen so that the needle can enter the passage opening while blocking it sealingly when the stem is pressed in against the effect of the spring (3), but can re-emerge from this passage opening under the effect of the spring when the pressure exerted on the stem ceases, thus leaving clear the passage opening (14).

When the valve is mounted, the membrane (2) is fixed sealingly to the concave wall (16), forming the reservoir (R), for example by welding their respective lateral edges (21, 161). The stem/connecting piece assembly (4) is placed inside the internal chamber (17) of the valve body, the needle (421) directed towards the passage opening (14). The spring (3) is interposed between the first shoulder (422) of the connecting piece and the radial wall (13) of the valve body so as to push the stem/connecting piece assembly (4) into the high position. The internal seal (5) is placed at the top of the ring (12) of the valve body and the tubular part (411) of the stem passes through the opening in the central part (61) of the cup and the central opening of the internal seal (5). The central opening of the seal (5) sealingly surrounds the tubular part (411) of the stem while allowing it the possibility of sliding. The cup is crimped around the ring (12) of the valve body so that the internal seal (5) provides a seal between the cup (6) and the valve body (1) and between the external face of the valve and the internal chamber (17). The entire face of the valve situated below the cup (6), that is to say in particular the internal face of the cup, the external surface of the valve body (1), constitutes the internal face of the valve intended to be placed inside the aerosol receptacle. The face of the valve situated above the cup, that is to say among other things the external face of the cup and the external surface of the tubular part (411) of the stem projecting above the internal seal (5), constitutes the external face of the valve intended to be placed outside the aerosol receptacle.

The valve of the invention functions as follows. In the rest position, that is to say when the valve is closed, the spring pushes the stem/connecting piece assembly (4) upwards. The outlet openings (413) of the stem are situated facing the internal seal (5) or above it. The needle (421) is situated outside the passage opening (14), above it. The annular ring (415) of the stem is in abutment against the internal seal (5). There is therefore a passage between the inside of the pipe (15) and the reservoir (R) via the passage opening (14), the internal chamber (17) of the valve body and the communication channel (163). On the other hand, there is no contact between the internal chamber (17) of the valve body and the inside of the tubular part (411) of the stem, firstly since the annular ring (415) is in abutment on the internal seal (5) and secondly since the outlet openings (413) are facing the internal seal (5) or above it. This is the situation shown in FIG. 2. Under the effect of the pressure prevailing in the receptacle (not shown), the product passes through the pipe (15), the passage opening (14), the internal chamber (17) and the communication channel (163), and enters the reservoir (R). The reservoir fills until the membrane (2) is tensioned.

If a pressure is exerted downwards on the stem (41), the latter moves, driving the connecting piece (42). The needle (421) enters the passage opening (14) in the valve body, obstructing it sealingly. The annular ring (415) moves away from the internal seal (5) and the outlet openings (413) pass below the latter (5). The internal chamber (17) and consequently the reservoir (R) are thus isolated from the inside of the receptacle because of the sealed obstruction of the passage opening (14) by the needle (421). On the other hand, the inside of the internal chamber (17) and consequently the reservoir (R) are in contact with the outside via the annular space situated between the wall of the main part of the valve body and the cylindrical part (414) of the stem, the outlet openings (413) and the inside of the tubular part (411). This is the situation shown in FIG. 3. Because of the difference in pressure between the inside of the reservoir subjected to a compressed gas and the outside of the valve, at atmospheric pressure, the membrane (2) is pushed against the concave wall (16), expelling the product through the communication channel (163). By virtue of the grooves (164), it is certain that the whole of the product contained at the reservoir is driven in the direction of the communication channel (163). The product expelled from the reservoir in the internal chamber (17) pushes the product contained in the latter in the direction of the passage openings (413), the tubular part (411) and the outside of the valve.

Given that the membrane (2) is subjected to the pressure of the compressed gas, it does not need to be elastic; it suffices for it to be flexible. It is therefore possible to choose a material that is both easy to weld to the valve body and compatible with the product contained in the aerosol. It is possible in particular to choose aluminium laminates, such as those used for the flexible pouches of bags on valve. It goes without saying that it would of course be possible to use elastic membranes, in particular made from elastomer, if there is no incompatibility with the product to be applied. In a favoured fashion, the valve body is produced from polypropylene (PP) or polyethylene (PE), the membrane has an internal surface compatible at the end of welding with a valve body, and the stem and the connecting piece are made from polyoxymethylene (POM), polyamide (PA) or nylon.

Although the rigid wall (16) and the membrane (2) are substantially radial in the example presented here, it will also be possible for them to be inclined with respect to the horizontal.

Likewise, it is possible to provide for the rigid wall (16) to constitute a separate piece, distinct from the rest of the valve body. For the same valve body, it is then possible to provide various sets of membranes/rigid walls of different sizes. With the same valve body model, it is possible to produce various metering valves with different volumes. The rigid wall and the membrane may be fixed to the valve body by any suitable means, such as welding, snapping on, overmoulding, etc.

The invention has several advantages. Firstly the choice of the material for the membrane (2) is very wide since it suffices for this to be flexible, without necessarily being elastic. It is therefore easy to adapt it according to the product contained in the reservoir.

Secondly, the volume of the reservoir (R) can easily be adapted to requirements. It is possible to a certain extent to vary the height of the reservoir. It is also possible to vary the cross-section of the cavity (162) and of the membrane (2). In the example presented here, the concave rigid wall (16) is in the shape of a kidney bean. However, it is possible to give it a shape having a smaller surface area, or on the contrary a larger surface area. It is in particular possible for the concave wall (16), and therefore also the membrane (2), to do a complete turn of the valve body so that the reservoir has an annular shape. In this case, it is possible to provide several communication channels (163). The surface area subjected to the pressure of the compressed gas is therefore very large compared with the volume. Consequently, even when the pressure is low at the end of life of the aerosol, for example 2 bar, it is all the same possible to obtain a properly formed spray, without droplets.

Finally, from the start to the end of each taking off, the surface area subjected to the pressure of the compressed gas remains the same. The spray emitted is therefore constant throughout the taking off. There is no risk of droplets forming at the end of the taking off.

The present valve may be adapted so as to be provided with an internal pouch in order to separate the product to be extracted from the pressurised gas. The reservoir (R) may be placed inside the pouch or on the other hand outside.

LIST OF REFERENCES

1 Valve body
 11 Main part
 12 Ring
 13 Radial wall
 14 Passage opening
 15 Pipe
 16 Concave rigid wall
 161 Peripheral edge
 162 Cavity
 163 Communication channel
 164 Grooves
 17 Internal chamber
2 Membrane
 21 Peripheral edge
3 Spring
4 Stem/connecting piece assembly
 41 Stem
 411 Tubular part
 412 Bottom wall
 413 Outlet openings
 414 Cylindrical part
 415 Ring
 416 Ribs
 42 Connecting piece
 421 Needle
 422 First shoulder
 423 Second shoulder
5 Internal seal
6 Cup
 61 Central part
R Reservoir

The invention claimed is:

1. Metering valve for an aerosol receptacle, having an internal face intended to be placed inside the aerosol receptacle and an external face intended to be placed outside the aerosol receptacle, said valve being provided with
 a valve body having an internal chamber able to be put in contact either with the internal face of the valve or with the external face of the valve,
 a stem provided with closure means and placed partly inside the internal chamber able to move between a closed position in which the internal chamber is in contact with the internal face of the valve, but isolated from the external face of the valve, and an open position in which the internal chamber is in contact with the external face of the valve but isolated from the internal face of the valve,
 a reservoir able to be filled when the stem is in the closed position and emptied when the stem is in the open position,
 wherein the reservoir is situated on a side of the internal face of the valve, outside the valve body, the reservoir is in contact with the internal chamber of the valve body, and the reservoir comprises at least one flexible membrane.

2. Valve according to claim 1, wherein the reservoir comprises a rigid wall on which the flexible membrane is fixed.

3. Valve according to claim 2, wherein at least one of (i) a face of the rigid wall directed towards the flexible membrane and (ii) a face of the flexible membrane directed towards the rigid wall has a cavity.

4. Valve according to claim 2, wherein the rigid wall forms an integral part of the valve body.

5. Valve according to claim 2, wherein the rigid wall constitutes a piece distinct from the valve body.

6. Valve according to claim 2, wherein grooves are provided in at least one of (i) a face of the rigid wall directed towards the flexible membrane and (ii) a face of the flexible membrane directed towards the rigid wall.

7. Valve according to claim 2, wherein the flexible membrane has a shape opposite to a shape of the rigid wall.

8. Valve according to claim 1, wherein the membrane is flexible but non-elastic.

9. Valve according to claim 1, wherein the membrane is produced from a single-material film or a multilayer complex film, with or without aluminium.

10. Valve according to claim 1, wherein the stem closure means are placed on a connecting piece forming a piece distinct from the stem, the closure means isolating the internal chamber from the internal face of the valve when the stem is in the open position, and putting the internal chamber and the internal face of the valve in contact when the stem is in the closed position.

11. Valve according to claim 10, wherein the internal chamber and the internal face of the valve are in contact via a passage opening, and the closure means of the connecting piece consist of a needle sized so as to enter the passage opening when the stem is in the open position while sealingly closing the passage opening.

12. Valve according to claim 1, wherein a communication channel is provided in the valve body for connecting the inside of the reservoir and the internal chamber, said channel emerging in the internal chamber.

13. Valve according to claim 12, wherein the channel emerges in the internal chamber close to the passage opening.

14. Valve according to claim 3, wherein the rigid wall forms an integral part of the valve body.

15. Valve according to claim 3, wherein the rigid wall constitutes a piece distinct from the valve body.

16. Valve according to claim 3, wherein grooves are provided in at least one of (i) a face of the rigid wall directed towards the flexible membrane and (ii) a face of the flexible membrane directed towards the rigid wall.

17. Valve according to claim 4, wherein grooves are provided in at least one of (i) a face of the rigid wall directed towards the flexible membrane and (ii) a face of the flexible membrane directed towards the rigid wall.

18. Valve according to claim 5, wherein grooves are provided in at least one of (i) a face of the rigid wall directed towards the flexible membrane and (ii) a face of the flexible membrane directed towards the rigid wall.

19. Valve according to claim 14, wherein the flexible membrane has a shape opposite to a shape of the rigid wall.

20. Valve according to claim 15, wherein the flexible membrane has a shape opposite to a shape of the rigid wall.

* * * * *